United States Patent
Fenichel et al.

(12)

(10) Patent No.: US 11,687,954 B2
(45) Date of Patent: Jun. 27, 2023

(54) LINKING PHYSICAL LOCATIONS AND ONLINE CHANNELS IN A DATABASE

(71) Applicant: Capital One Services, LLC, McLean, VA (US)

(72) Inventors: Allison Fenichel, Brooklyn, NY (US); Fan Feng, New York, NY (US); Illiana Reed, San Francisco, CA (US)

(73) Assignee: Capital One Services, LLC, McLean, VA (US)

( * ) Notice: Subject to any disclaimer, the term of this patent is extended or adjusted under 35 U.S.C. 154(b) by 93 days.

(21) Appl. No.: 17/113,546

(22) Filed: Dec. 7, 2020

(65) Prior Publication Data

US 2022/0180378 A1    Jun. 9, 2022

(51) Int. Cl.
*G06Q 30/0201* (2023.01)
*G06N 20/00* (2019.01)
*G06F 16/29* (2019.01)
*G06F 16/28* (2019.01)
*G06N 5/04* (2023.01)

(52) U.S. Cl.
CPC ....... *G06Q 30/0201* (2013.01); *G06F 16/288* (2019.01); *G06F 16/29* (2019.01); *G06N 5/04* (2013.01); *G06N 20/00* (2019.01)

(58) Field of Classification Search
CPC ........ G06Q 30/201; G06N 20/00; G06N 5/04; G06F 16/288; G06F 16/29
USPC ....................................... 706/7.29; 705/7.29
See application file for complete search history.

(56) References Cited

U.S. PATENT DOCUMENTS

| | | | |
|---|---|---|---|
| 2014/0358661 A1* | 12/2014 | Or | G06Q 30/0226 705/14.27 |
| 2018/0053252 A1* | 2/2018 | Koltnow | G06Q 40/025 |
| 2021/0173825 A1* | 6/2021 | Lu | G06F 16/174 |
| 2021/0201186 A1* | 7/2021 | Margolin | G06N 3/0472 |

OTHER PUBLICATIONS

Diaz, et al., A Comparison of Online and Offline Consumer Behaviour: An Empirical Study on a Cinema Shopping Context, 38 Journal of Retailing and Consumer Services at pp. 44-50 (2017) (Year: 2017).*

* cited by examiner

*Primary Examiner* — Charles Guiliano
(74) *Attorney, Agent, or Firm* — Harrity & Harrity, LLP

(57) ABSTRACT

In some implementations, a device may receive, from one or more data sources, information indicating a plurality of data sets, where the plurality of data sets indicate information associated with respective physical locations or online locations. The device may identify a data set, from the plurality of data sets, that indicates information associated with an online location, where the information includes at least one of an entity name, an address, a phone number, a uniform resource locator, an entity identifier, or metadata. The device may parse the data set to identify information for a set of features. The device may analyze the information for the set of features to determine a brand associated with the online location. The device may pair the online location with the brand in the database such that the online location is linked with a first physical location of the brand in the database.

20 Claims, 7 Drawing Sheets

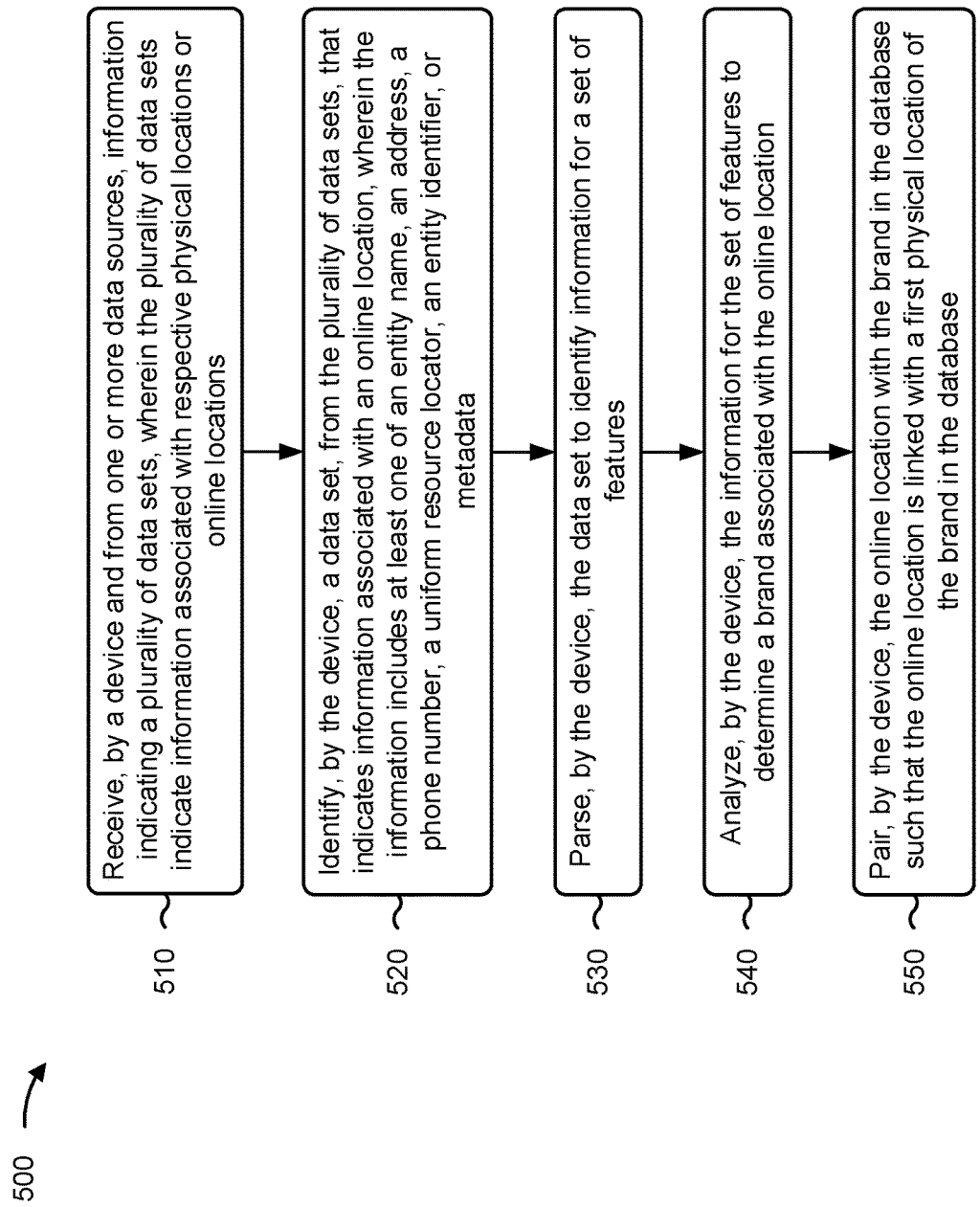

LINKING PHYSICAL LOCATIONS AND ONLINE CHANNELS IN A DATABASE

BACKGROUND

Data storage, such as a database, a table, and/or a linked list, refers to a set of related data and the way it is organized. A relational database is a collection of schemas, tables, queries, reports, or views. A data storage management system is an application that interacts with users, other applications, and databases to allow definition, creation, querying, updating, and/or administration of data storage.

SUMMARY

In some implementations, a system for linking physical location data and online channel data of entities in a database includes one or more memories; and one or more processors, communicatively coupled to the one or more memories, configured to: receive information associated with a plurality of locations, where the plurality of locations include at least one in-person location and at least one online location; identify, from the plurality of locations, candidate locations, parse information associated with the candidate locations to identify information for a set of features, where the set of features include at least one of a name, a phone number, a geographic location, a uniform resource locator, a headquarter address, an entity category, metadata, or transaction data; apply a machine learning model to the information for the set of features for the candidate locations; determine whether the candidate locations are associated with a same entity based on an output of the machine learning model; and add the candidate locations to a graph associated with the entity if the candidate locations are associated with the entity, where the graph associated with the entity indicates at least one online location associated with the entity and at least one in-person location associated with the entity.

In some implementations, a method of linking physical locations and online locations with a brand in a database includes receiving, by a device and from one or more data sources, information indicating a plurality of data sets, where the plurality of data sets indicate information associated with respective physical locations or online locations; identifying, by the device, a data set, from the plurality of data sets, that indicates information associated with an online location, where the information includes at least one of an entity name, an address, a phone number, a uniform resource locator, an entity identifier, or metadata; parsing, by the device, the data set to identify information for a set of features; analyzing, by the device, the information for the set of features to determine a brand associated with the online location; and pairing, by the device, the online location with the brand in the database such that the online location is linked with a first physical location of the brand in the database.

In some implementations, a non-transitory computer-readable medium storing a set of instructions includes one or more instructions that, when executed by one or more processors of a device, cause the device to: receive information associated with physical locations of entities and online channels of entities, where the information includes a plurality of data sets, where each data set, of the plurality of data sets, indicates information associated with a physical location or an online channel; process the information based on one or more features to identify candidate data sets, where the candidate data sets include two or more data sets with at least one data set associated with a physical location and at least one data set associated with an online channel; apply a model to the candidate data sets to determine a score, where the score indicates a likelihood that the two or more data sets are associated with a same entity; and link the two or more data sets in the database based on a determination that the score satisfies a threshold, where the linking indicates that the two or more data sets are associated with the same entity.

BRIEF DESCRIPTION OF THE DRAWINGS

FIG. 5 is a flowchart of an example process relating to linking physical location data and online channel data in a database.

DETAILED DESCRIPTION

Figure 1A:
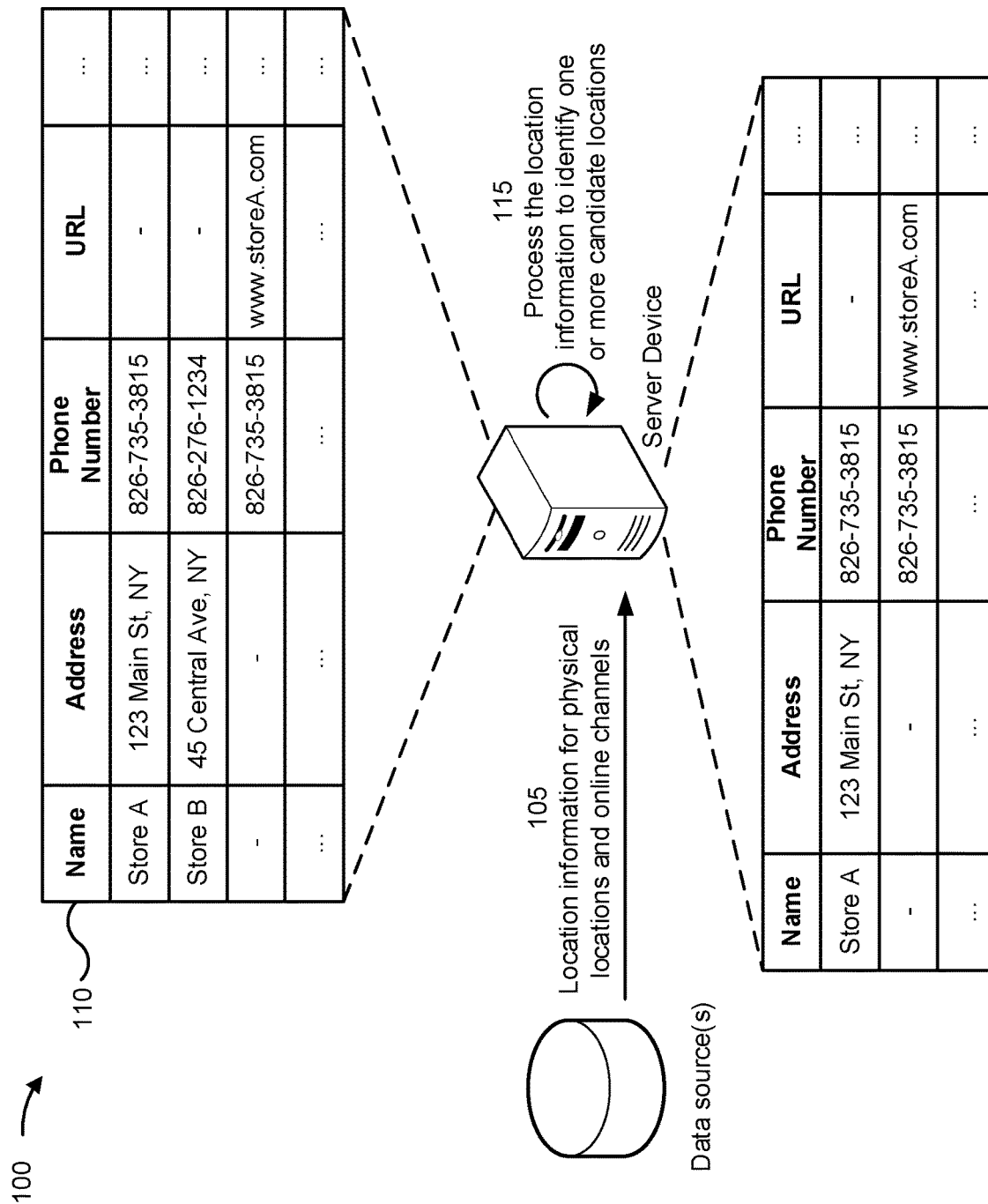
FIGS. 1A-1C are diagrams of an example implementation relating to linking physical location data and online channel data in a database.

The following detailed description of example implementations refers to the accompanying drawings. The same reference numbers in different drawings may identify the same or similar elements.

An entity, such as a merchant or other company, may be associated with an online presence (e.g., an online channel, such as a website) as well as one or more physical locations (e.g., brick-and-mortar locations). In an ontology of the entity, a user may associate the online presence and the physical locations of the entity with a brand of the entity. A brand may be a name, term, design, symbol or any other feature that identifies one entity's good or service as distinct from those of other entities. To gain an understanding of different entities, a database may be created that stores location information associated with different entities. For example, a database may be created that links information (e.g., name, geographic location, address, and/or phone number) of all physical locations of an entity. Similarly, a database may be created that stores information (e.g., name, uniform resource locator (URL), and/or website directory) of different online channels (e.g., websites) and links each online channel with an entity.

However, it is difficult to associate or link the online channels of an entity with the physical locations of the entity. For example, an online channel may be associated with different types of location information (e.g., a URL, a headquarter address, and/or a headquarter phone number) than location information associated with a physical location (e.g., a geographic location, a local address, and/or a local phone number). Therefore, it is difficult to determine when an online channel and a physical location are associated with the same entity (e.g., the same brand). Moreover, an online channel may be associated with multiple physical locations, each of which may have different location information. Consequently, it is difficult to determine when an online channel and the multiple physical locations are associated with the same entity. As a result, to gain an understanding of a brand (e.g., across all physical locations and online channels associated with an entity), it is necessary to identify, create, and/or parse through multiple databases and/or multiple data sources to collect information associated with the brand. This consumes significant computing resources (e.g., processing resources), network resources, and time resources associated with identifying, creating, calling, and/or parsing through multiple databases and/or multiple data sources to collect information associated with the brand. Additionally, a database that includes location information for different entities may include hundreds, thousands, or millions of entries. Therefore, identifying, creating, and/or storing the multiple databases and/or multiple data sources needed to collect information associated with the brand consumes significant memory resources.

Some implementations described herein enable linking physical location data of an entity and online channel data of the entity in a database under a brand. For example, a system may collect location information associated with physical locations and location information associated with online channels. The system may process or analyze the information to identify a brand associated with a physical location and/or an online channel. In some implementations, the system may process or analyze the information to determine whether an online channel and a physical location are associated with the same entity or brand. The system may link information associated with online channel(s) and/or information associated with physical location(s) that are associated with the same brand. For example, the system may create or update a graph (e.g., a component graph or a knowledge graph) that links identifiers or data of online channel(s) and physical location(s) that are associated with the same brand. The system may store the linked information associated with online channel(s) and/or information associated with physical location(s) that are associated with the same brand in a database such that the information associated with online channel(s) and/or information associated with physical location(s) can be quickly and easily identified in a single database.

As a result, the system may be enabled to analyze information associated with a brand in a more efficient manner. For example, the system may receive a request from a third party that requests or is based on information associated with a brand. The system may be enabled to quickly and easily identify information associated with each online channel and/or information associated with each physical location of the brand by parsing or searching the database for the brand, as compared to parsing or searching multiple databases with potentially different search queries or application programming interface (API) calls. Moreover, the system may be enabled to aggregate and/or analyze data associated with the brand more efficiently (e.g., as compared to using multiple, disparate databases) because the system can quickly identify and/or retrieve data across each online channel and/or each physical location of the brand using the database (e.g., a single database). This enables the system to process a request for data associated with a brand and/or aggregate or analyze data associated with the brand faster. As a result, the system may conserve significant computing resources (e.g., processing resources and memory resources) and/or network resources that would have otherwise been used by the system to identify, create, call, and/or parse through multiple databases and/or multiple data sources to collect information associated with the brand.

Additionally, because the system is enabled to organize and/or store information by brand across each online channel and each physical location of the brand, the system may be enabled to eliminate duplicative information associated with the brand, such as a phone number and/or a headquarter address, among other examples. Because the database may include hundreds, thousands, or millions of entries, enabling the system to eliminate duplicative information associated with a brand by linking, in the database, information associated with each online channel and information associated with each physical location of the brand may conserve significant memory resources. Conserving memory resources in this manner enables the system to increase processing efficiency and/or reduce a processing time associated with processing a request for data associated with a brand and/or aggregating or analyzing data associated with the brand.

Figure 1B:
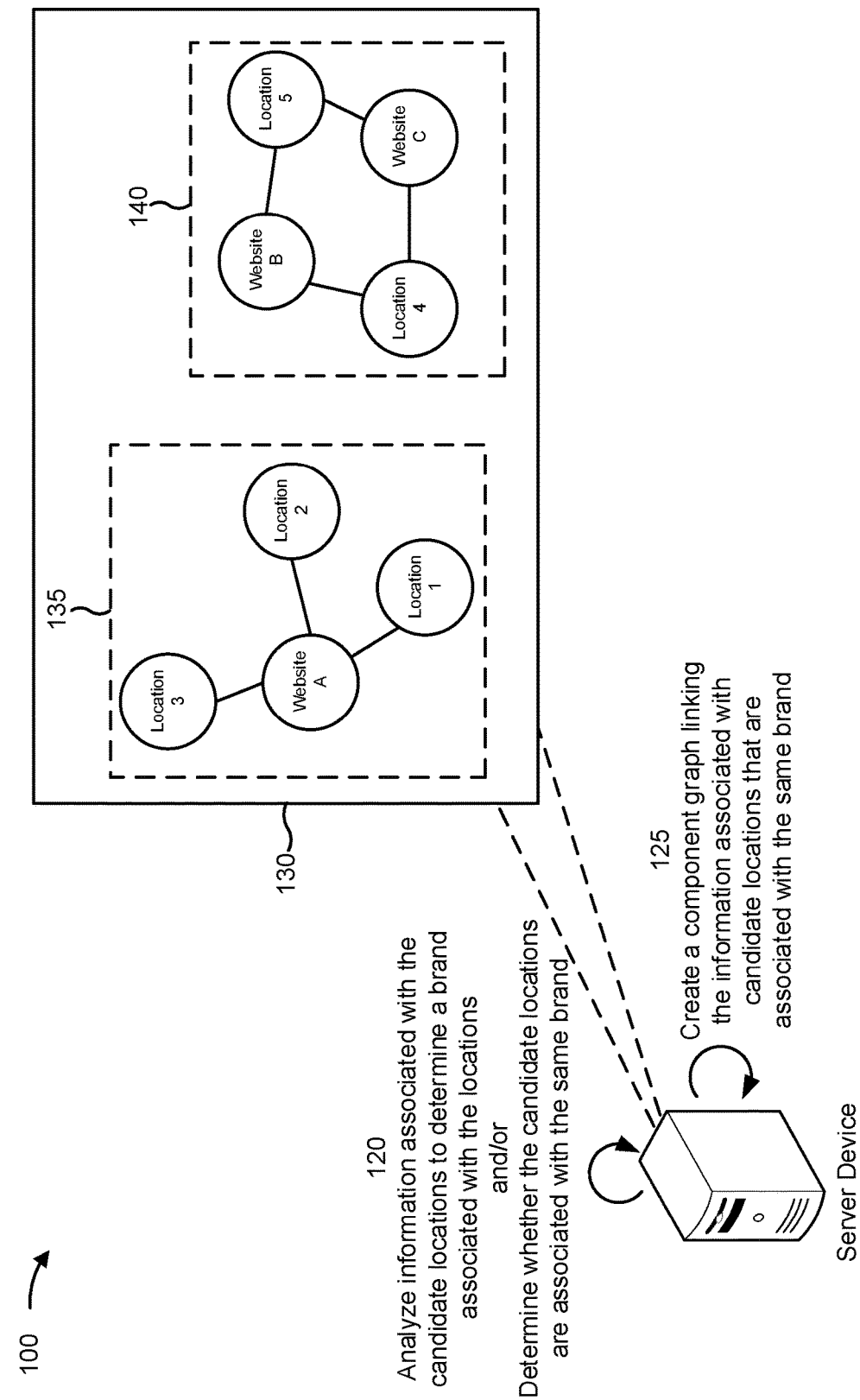
Figure 1C:
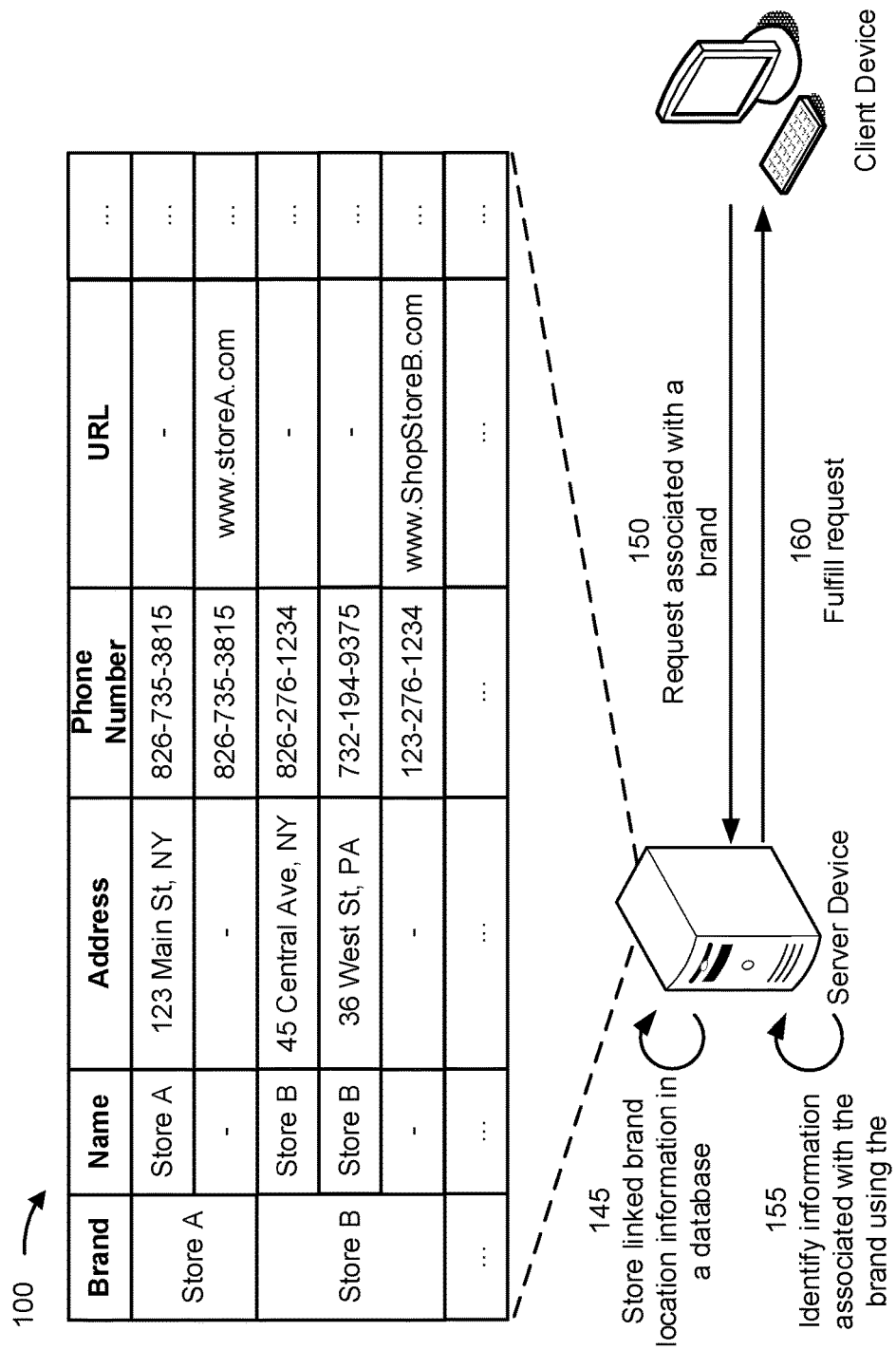

FIGS. 1A-1C are diagrams of an example 100 associated with linking physical location data and online channel data in a database. As shown in FIGS. 1A-1C, example 100 includes a server device that communicates and/or retrieves information from one or more data sources. The server device may communicate with a client device to receive a request and/or provide information associated with a brand, as described in more detail herein. These devices are described in more detail in connection with FIGS. 3 and 4.

As shown in FIG. 1A, and by reference number 105, the server device may receive location information for physical locations and online channels from one or more data sources. An online channel may include a website, a webpage, a group page, and/or a page or account associated with a platform, such as a social media platform or an exchange platform (e.g., a Facebook page or an Amazon seller account). The location information may include information that can be used to locate and/or identify the physical location and/or online channel. For example, for a physical location, location information may include an entity name, an address, a phone number, a geographic location (e.g., longitude and latitude coordinates), and/or a category (e.g., an entity category or a seller category), among other examples. For an online channel, location information may include a uniform resource locator (URL), a network address, and/or information that is extracted from the online channel, among other examples. The information that is extracted from the online channel may include an entity name, an address, a headquarter address, a phone number, a category (e.g., an entity category or a seller category), a directory, metadata, and/or location information for one or more physical locations, among other examples.

In some implementations, the server device may obtain (or may instruct another device to obtain) location information via an automated web-based interaction (e.g., web crawling, web scraping, data mining, web searching, and/or database searching). For example, the server device may obtain (or may instruct another device to obtain) location information for online channels via the automated web-based interaction. The server device (or another device) may store the location information obtained via the automated web-based interaction in a data source included in the one or more data sources.

As shown by reference number 110, the server device may obtain one or more data sets (including location information) for multiple entities. An entry in a data set may indicate location information for a physical location or an online channel. For example, as shown in FIG. 1A, an entry may indicate location information for a physical location with a name of Store A, an address of 123 Main Street, New York, and a phone number of 826-735-3815. Similarly, an entry may indicate location information for an online channel with a phone number of 826-735-3815 and a URL of www.StoreA.com.

In some implementations, the server device may arrange or organize the location information received from the one or more data sources to identify a set of features associated with the location information. The set of features may include an entity name, address, phone number, URL, geographic location, and/or category, among other examples. The server device may arrange or organize the location information received from the one or more data sources such that the server device is enabled to identify values or inputs for the set of features that is indicated by the location information. For example, the server device may receive unorganized and/or raw data from the one or more data sources. For a physical location or an online channel, the server device may identify values or inputs for the set of features. The server device may store the identified values or inputs for the set of features in a data structure, such as a database, in an organized manner (e.g., by feature, as shown in FIG. 1A), such that the server device is enabled to easily compare information between different physical locations or online channels for a certain feature.

In some implementations, the server device may obtain multiple data sets. The server device may arrange and/or organize the multiple data sets such that the multiple data sets are structured in a similar manner. For example, the server device may arrange the multiple data sets by feature, such that the server device is enabled to compare an entry for a feature of a physical location or online channel in a first data set to an entry for the same feature of a physical location or online channel in a second data set.

As shown by reference number 115, in some implementations, the server device may process (or pre-process) the location information to identify one or more candidate locations. Candidate locations (or a candidate pair) may be two or more locations (e.g., physical locations and/or online channels) that are potentially associated with the same entity (e.g., that are candidates for being associated with the same entity). In some implementations, the server device may process or analyze the location information to identify candidate locations that have a threshold likelihood of being associated with the same entity. The server device may analyze information for a certain feature across all entries included in a data set (or may compare information for a certain feature between entries of multiple data sets) to identify the candidate locations. For example, the server device may analyze the information for a feature (or a subset of features from the set of features) to identify entries that have similar inputs or values for the feature. The server device may determine the similarity based on one or more similarity analysis techniques, such as a semantic similarity, a cosine similarity, a centroid similarity, and/or an exact match, among other examples. In some implementations, the server device may determine a similarly score that indicates a likelihood that two or more locations are associated with the same entity. The server device may determine that two or more locations are candidate locations if a similarity score for the two or more locations satisfies a threshold. This processing or pre-processing enables the server device to filter or reduce an amount of information or entries that the server device is required to analyze and/or process in actions described in more detail below. As a result, computing resources, memory resources, and/or time resources may be conserved by the server device that would have otherwise been used had this processing or pre-processing not been performed by the server device.

As shown in FIG. 1B, and by reference number 120, the server device may analyze information associated with locations (e.g., candidate locations or other locations) to determine a brand (or entity) associated with the locations. For example, the server device may analyze location information for a physical location or an online channel to determine a brand associated with the physical location or the online channel. In some implementations, the server device may input the location information into a model, such as a machine learning model. The machine learning model may provide an output based on the input of the location information. The server device may determine the brand associated with the physical location or the online channel based on the output of the machine learning model. For example, the output of the machine learning may indicate the brand. In some implementations, the output of the machine learning model may be a score that indicates a likelihood that the physical location or the online channel is associated with a certain brand. The server device may determine that the physical location or the online channel is associated with the brand if the score output by the machine learning model satisfies a threshold. Example machine learning techniques used to determine the brand associated with the physical location or the online channel are described below in more detail in connection with FIG. 2.

In some implementations, the server device may determine whether candidate locations (e.g., two or more locations) are associated with the same brand. The server device may compare location information across the candidate locations. For example, the server device may compare entity names, phone numbers, addresses, headquarter addresses, geographic locations, categories, metadata, and/or transaction information (e.g., transaction dates, amounts, locations, and/or categories) across the candidate locations.

In some implementations, the server device may determine a similarity score for a feature, across the candidate locations, that indicates a likelihood that the input or value for the feature is associated with the same brand across the candidate locations. In some implementations, the similarity score for a feature may be a binary match (e.g., a value of 1) or no match (e.g., a value of 0). In some implementations, the similarity score for a feature may a value between 0 and 1, where a value closer to 1 indicates a higher likelihood that the input or value for the feature is associated with the same brand. For example, the server device may determine a similarity score for an entity name (or URL) across the candidate locations. In some implementations, the server device may compare an entity name of a physical location to a URL of an online channel to determine a similarity score between the entity name and the URL (e.g., between an entity name of Store B and a URL of www.ShopStoreB.com). In some implementations, the server device may use different similarity analysis techniques for different features. For example, for a comparison between entity names and/or URLs, the server device may use a string similarity technique, or a Jaro-Winkler technique (e.g., a string metric measuring an edit distance between two sequences). For a comparison between phone numbers, the server device may use an exact match technique, where the score is either 1 (if the phone numbers match) or 0 (if the phone numbers do not match).

The server device may use the similarity scores for different features as inputs to a machine learning model. For example, the server device may input a similarity score for a name or URL comparison, an address comparison, and/or a phone number comparison, among other examples. An output of the machine learning model may indicate a likelihood that the candidate locations are associated with the same brand. For example, an output of the machine learning model may be a score that indicates the likelihood that the candidate locations are associated with the same brand. The server device may determine whether the score satisfies a threshold. If the score does satisfy the threshold, then the server device may determine that the candidate locations are associated with the same brand. If the score does not satisfy the threshold, then the server device may determine that the candidate locations are not associated with the same brand.

The techniques described above enable the server device to link online channels and physical locations of a brand or entity. In some implementations, the linking may be a one-to-many relationship. For example, an online channel (such as a website) of a brand may be linked to multiple physical locations of the brand. Additionally, or alternatively, multiple online channels (e.g., multiple websites or pages) of a brand may be linked together. In some implementations, the multiple online channels may be linked to one or more physical locations of the brand. This enables the server device to gain a better understanding of an entire brand, by linking all commerce channels (e.g., online channels and physical locations) of the brand in a single location (e.g., in a database, as described in more detail below).

As shown by reference number 125, the server device may create or update a graph 130 (e.g., a component graph or a knowledge graph) that links information associated with candidate locations that are associated with the same brand. For example, the server device may create a graph having nodes (e.g., components or elements) that correspond to an identifier of a location (e.g., a physical location or an online channel). The server device may link or connect nodes in the graph (e.g., may connect nodes with an edge) if the corresponding locations are associated with the same brand or entity.

For example, as described above, the server device may determine a brand associated with a physical location or online channel and/or may determine that candidate locations are associated with the same brand. The server device may determine whether a graph associated with the brand is already stored by the server device (e.g., in a database). If the server device determines that a graph associated with the brand is already stored by the server device, then the server device may identify and/or retrieve the graph and may update the graph to include an identifier associated with the location (e.g., the physical location or the online channel) or the candidate locations. If the server device determines that a graph associated with the brand is not stored by the server device, then the server device may create a graph that includes an identifier associated with the location (e.g., the physical location or the online channel) or the candidate locations and indicates the links or connection between the locations indicated by the graph.

In FIG. 1B, an example graph 130 is depicted. As shown by reference number 135, the graph 130 includes a first set of linked locations associated with a first brand. The first set of linked locations may link an identifier of a first online channel (website A) to a location 1, a location 2, and a location 3. For example, the server device may determine that website A and location 1, location 2, and location 3 are associated with the same brand or entity (e.g., the first brand), as described above. The server device may create or update the graph 130 to include links or connections between website A and location 1, location 2, and location 3. As a result, the server device may quickly identify that website A and location 1, location 2, and location 3 are associated with the same brand based on the linkages.

Similarly, as shown by reference number 140, the graph 130 includes a second set of linked locations associated with a second brand. The second set of linked locations may link an identifier of a second online channel (website B) with a location 4 and a location 5. Additionally, the second set of linked locations may link an identifier of a third online channel (website C) with location 4 and location 5. Although website B and website C may not be directly linked in the graph 130, the server device may be enabled to determine that website B and website C are associated with the same brand based on the corresponding linkages to location 4 and location 5.

By using the linkages in a graph, as described above, the server device may be able to associate online channels and physical locations with a brand. For example, the server device may determine that each node in the graph that includes common links or is otherwise linked together (e.g., directly or through another node) is associated with the same brand. Graph 130 is provided as an example. In some implementations, a graph 130 may be brand-specific and may only include nodes (e.g., corresponding to location identifiers) associated with a single brand. In some implementations, a graph 130 may include nodes associated with a plurality of brands (e.g., tens, hundreds, or thousands of brands).

As shown in FIG. 1C, and by reference number 145, the server device may store linked brand location information in a database (e.g., a brand database). The brand location information may include location information for each physical location and each online channel that the server device has determined is associated with a same brand, as described above. For example, as shown in FIG. 1C, the server device may store brand location information for a brand Store A. The brand location information may include location information for a physical location (e.g., with a name of Store A, an address of 123 Main Street, New York, and a phone number of 826-735-3815) and an online location (e.g., with a phone number of 826-735-3815 and a URL of www.StoreA.com).

Similarly, the server device may store brand location information for a brand Store B. The brand location information may include location information for a first physical location (e.g., with a name of Store B, an address of 45 Central Ave, New York, and a phone number of 826-276-1234), a second physical location (e.g., with a name of Store B, an address of 36 West Street, Pennsylvania, and a phone number of 732-194-9375) and an online location (e.g., with a phone number of 123-276-1234 and a URL of www.Shop-StoreB.com). The server device may store brand location information in the brand database for a brand such that the location information for each physical location and/or online channel associated with the brand is linked to the brand (e.g., using an identifier or flag in the brand database, shown in FIG. 1C as a brand feature of "Store A" and "Store B" in the "Brand" column). The server device may store brand location information in the brand database for multiple brands. In some implementations, the server device may store a graph (e.g., graph 130) for a brand in the brand database. In some implementations, the server device may determine the brand location information associated with a brand (e.g., that is to be stored in the brand database as described above) based on a graph (e.g., graph 130) for the brand.

In some implementations, brand location information may include duplicative information. For example, as shown in FIG. 1C, the brand location information for Store A includes the same phone number for the physical location and the online channel associated with Store A brand. The server device may identify duplicative information included in the brand location information. The server device may remove (e.g., delete from memory) or refrain from storing (e.g., in memory) the duplicative information such that information included in the brand location information is only stored once by the server device. In some implementations, the server device may include a mapping to the location where information is stored in the brand database. For example, for the brand location information of Store A, rather than storing the same phone number twice, the server device may store the phone number once and include a mapping to the location of the stored phone number in subsequent location information entries. As a result, storing the brand location information in this manner enables the server device to reduce an amount of information stored by the server device in the brand database. As the brand database may include hundreds, thousands, or millions of entries, enabling the server device to eliminate or not store duplicative information included in brand location information in the brand database may conserve significant memory resources. Conserving memory resources in this manner enables the server device to increase processing efficiency and/or reduce a processing time associated with processing a request for data associated with a brand and/or aggregating or analyzing data associated with the brand, as described in more detail herein.

As shown by reference number 150, the server device may receive a request, associated with a brand, from a client device. For example, the server device may receive a request for transaction data associated with a brand. In some implementations, the server device may receive a request associated with multiple brands. For example, the server device may receive a request associated with a category of goods or services that is associated with multiple brands. The server device may determine or identify one or more brands associated with the category of goods or services.

As shown by reference number 155, based on receiving the request, the server device may identify information associated with the brand using the brand database. For example, the request may be for transaction data associated with a brand. The server device may identify each physical location and online channel associated with the brand by searching for the brand in the brand database and/or identifying a graph (e.g., a component graph) associated with the brand. The server device may aggregate transaction data across each physical location and online channel associated with the brand. In this way, the server device is enabled to provide more accurate transaction data for a brand. Moreover, the server device may quickly identify each physical location and online channel associated with the brand using the brand database, thereby reducing computing resources and/or processing time associated with identifying the information associated with the request.

In some implementations, if the request is associated with multiple brands or a category, the server device may identify the brands associated with the request and may identify each physical location and online channel associated with the brands. The server device may be enabled to compare transaction data across the brands, identify specific types or categories of transactions across the brands, and/or identify marketing or advertisement information (e.g., deals advertised by the brands and/or prices of a specific product or service at each brand) across the brands, among other examples. Therefore, the server device may be enabled to quickly and easily compare information across multiple brands while having a more accurate understanding of each brand because each physical location and online channel associated with the brands can be identified by the server device. In this way, the server device is enabled to provide more accurate information across multiple brands, conserving computing resources and processing time that would have otherwise been used to identify each brand, collect location information for each brand (e.g., physical locations and online channels) using multiple databases and/or multiple data sources, collect information for each brand, and/or compare or aggregate the information for each brand.

In some implementations, the request may be associated with an account (e.g., a transaction account or a credit account) of an entity that is using the client device. For example, the request may be for the server device to create a temporary credential or identifier for the account (e.g., a virtual identifier or a virtual card number) or a temporary transaction card. The request may indicate a brand or entity with which the temporary identifier or temporary transaction card is to be associated (e.g., if the temporary identifier or temporary transaction card is used to initiate a transaction at an entity other than the indicated entity or brand, then the transaction will be declined). The server device may identify physical locations and online channels associated with the brand by searching for the brand in the brand database and/or identifying a graph (e.g., a component graph) associated with the brand.

In some implementations, the request may indicate a geographic limitation in addition to the brand or entity limitation. For example, the request may indicate that the temporary identifier or temporary transaction card is to be valid for online transactions and/or for in-person transactions that are within a certain city, a certain zip code, and/or a certain state, among other examples. The server device may identify physical locations of the brand or entity that are located within the geographic limitation indicated by the request. The server device may create the temporary identifier or temporary transaction card such that the temporary identifier or temporary transaction card is enabled to complete transactions at each physical location and/or online channel associated with the brand or entity identified by the server device, as described above.

Therefore, the server device is enabled to determine physical locations and/or online channels that are to be associated with the temporary identifier or temporary transaction card faster and more accurately, thereby reducing computing resources and/or processing time associated with creating the temporary identifier or temporary transaction card. Moreover, the server device is enabled to reduce a chance of a false decline associated with the temporary identifier or temporary transaction card by having a complete understanding of all physical locations and/or online channels of a brand. For example, the server device may reduce a chance that a transaction initiated using the temporary identifier or temporary transaction card is declined at a physical location or online channel that is associated with the brand or entity and that did satisfy the request from the client device.

As shown by reference number 160, the server device may fulfill the request received from the client device. For example, the server device may transmit an indication of transaction data associated with a brand. In some implementations, the server device may transmit an indication of aggregated or comparative information across multiple brands. In some implementations, the server device may transmit an indication of a temporary identifier. In some implementations, the server device may cause a temporary transaction card to be manufactured and may send the temporary transaction card to an entity associated with the request. As described above, as the server device has a complete understanding of a brand (e.g., has linked physical locations and online channels of the brand), the server device is enabled to quickly fulfill a request associated with the brand (or multiple brands) by eliminating the need to identify and/or determine each physical locations and online channels of the brand. Moreover, the server device may provide more accurate information associated with the brand as the server device is enabled to aggregate information associated with the brand across all linked physical locations and online channels of the brand (e.g., rather than relying on information from a single online channel/physical location or information from a subset of online channels/physical locations).

In some implementations, the server device may perform one or more actions associated with a brand without receiving a request from the client device. For example, the server device may receive an indication of a transaction completed using resources of an account associated with a user. The server device may determine or identify a physical location or an online channel associated with the transaction. The server device may determine or identify a brand associated with the physical location or the online channel associated with the transaction (e.g., using the brand database). The server device may identify information associated with the brand that is to be provided to the user associated with the transaction. For example, the server device may identify a logo or brand identifier, a URL of an online channel associated with the brand (e.g., if the transaction was completed at a physical location), an incentive or reward program associated with the brand, and/or transaction data associated with the brand, among other examples. The server device may transmit an indication of information associated with the brand to a client device associated with the user. Therefore, the user is enabled to quickly identify the brand associated with the transaction or other information associated with the brand (e.g., a return policy, terms and conditions, a website, and/or among other examples). This conserves computing resources that would have otherwise been used by the user to identify and/or retrieve the information associated with the brand.

In some implementations, the server device may aggregate and/or analyze information across a brand (e.g., across physical locations and online channels associated with the brand). In some implementations, the server device may receive transaction data that indicates a physical location or an online channel associated with the transaction data. The server device may identify a brand (e.g., in the brand database) based on the physical location or the online channel associated with the transaction data. In some implementations, the server device may identify a component graph that indicates the physical location or the online channel associated with the transaction data (e.g., and indicates a brand associated with the component graph). The server device may associate with transaction data with the brand that is associated with the physical location or the online channel associated with the transaction data. In this way, the server device may quickly and easily aggregate transaction data across a brand (e.g., across physical locations and online channels associated with the brand).

In some implementations, the server device may obtain transaction data associated with a brand across physical locations and online channels associated with the brand (e.g., identified using the brand database and/or component graph(s), as described above). The server device may analyze the transaction data to determine transaction trends or patterns associated with the brand. Additionally, or alternatively, the server device may analyze or compare online transaction data and in-person transaction data (e.g., transactions completed at a physical location) for brand to identify trends or patterns across online transaction data compared to in-person transaction data for the brand. As the server device may be enabled to aggregate the information (e.g., transaction data) associated with the brand across physical locations and online channels, the server device is enabled to quickly and more efficiently analyze and/or compare the information associated with the brand. This conserves computing resources (e.g., processing resources) and time resources that would have otherwise been used to analyze and/or compare the information associated with the brand.

As indicated above, FIGS. 1A-1C are provided as an example. Other examples may differ from what is described with regard to FIGS. 1A-1C.

Figure 2:
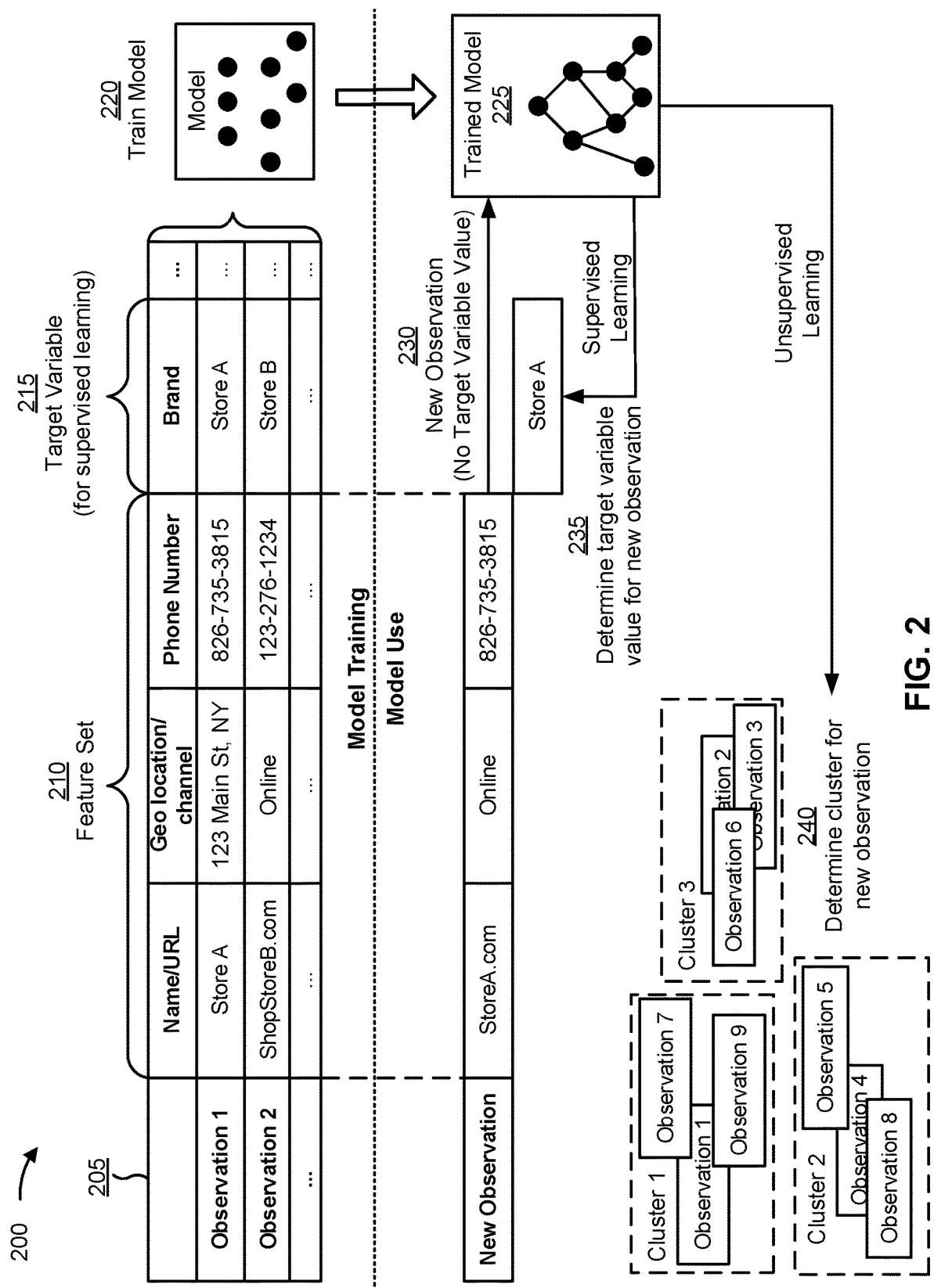
FIG. 2 is a diagram illustrating an example of training and using a machine learning model in connection with linking physical location data and online channel data in a database.

FIG. 2 is a diagram illustrating an example 200 of training and using a machine learning model in connection with linking physical location data and online channel data in a database. The machine learning model training and usage described herein may be performed using a machine learning system. The machine learning system may include or may be included in a computing device, a server, a cloud computing environment, or the like, such as the server device described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from one or more data sources or a server device, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from one or more data sources or a server device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of entity name or URL, a second feature of geographic location (e.g., address) or channel, a third feature of phone number, and so on. As shown, for a first observation, the first feature may have a value of Store A, the second feature may have a value of 123 Main Street, New York, the third feature may have a value of 826-735-3815, and so on. These features and feature values are provided as examples, and may differ in other examples. For example, the feature set may include one or more of the following features: a headquarters' address, a headquarters' phone number, an entity category, metadata, or transaction data (e.g., transaction amount, average transaction amount, transaction dates or times, and/or transaction locations), among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a brand, which has a value of Store A for the first observation.

The feature set and target variable described above are provided as examples, and other examples may differ from what is described above. For example, for a target variable that indicates whether two or more candidate locations are associated with the same brand, the feature set may include similar (or the same) features as described above. However, the values of the features may be scores indicating a similarity between the two or more candidate locations for each feature. The value of the target variable may be 1 (if the two or more candidate locations are associated with the same brand) or 0 (if the two or more candidate locations are not associated with the same brand).

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of entity name or URL, a second feature of geographic location (e.g., address) or channel, a third feature of phone number, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of Store A for the target variable of brand for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, that a physical location or online channel is associated with Store A. The first automated action may include, for example, storing location information for the physical location or the online channel in a database such that the location information is associated with Store A or adding an identifier associated with the physical location or the online channel to a component graph associated with Store A.

As another example, if the machine learning system were to predict a value of 0 for a target variable that indicates whether two or more candidate locations are associated with the same brand, then the machine learning system may provide a second (e.g., different) recommendation (e.g., that candidate locations associated with the input values of the features are not associated with the same brand) and/or may perform (or refrain from performing) or cause performance of (or prevent performance of) a second (e.g., different) automated action (e.g., refrain from storing location information associated with the candidate locations in the database as linked with the same brand).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a cluster of physical locations or online channels associated with Store A), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a cluster of physical locations or online channels associated with Store B), then the machine learning system may provide a second (e.g., different) recommendation (e.g., link the location information with store B) and/or may perform or cause performance of a second (e.g., different) automated action, such as storing location information for the physical location or the online channel in a database such that the location information is associated with Store B or adding an identifier associated with the physical location or the online channel to a component graph associated with Store B.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to link information for physical locations and online locations of a brand or entity. The machine learning system enables recognition and/or identification of tens, hundreds, thousands, or millions of features and/or feature values for tens, hundreds, thousands, or millions of observations, thereby increasing accuracy and consistency and reducing delay associated with linking information for physical locations and online locations of a brand or entity relative to requiring computing resources to be allocated for tens, hundreds, or thousands of operators to manually link information for physical locations and online locations of a brand or entity using the features or feature values.

As indicated above, FIG. 2 is provided as an example. Other examples may differ from what is described in connection with FIG. 2.

Figure 3:
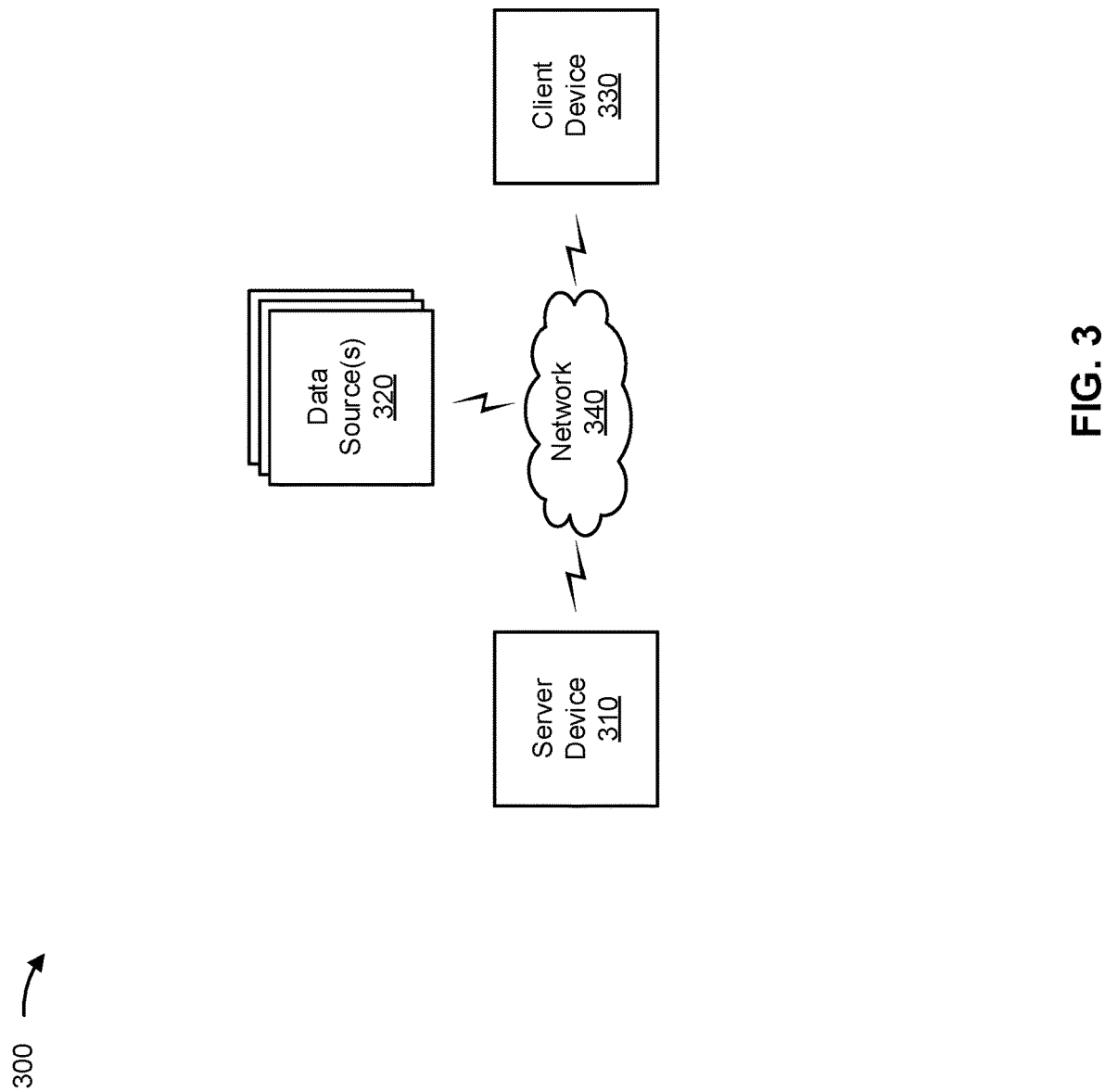
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a server device 310, one or more data sources 320, a client device 330, and a network 340. Devices of environment 300 may interconnect via wired connections, wireless connections, or a combination of wired and wireless connections.

The server device 310 includes one or more devices capable of receiving, generating, storing, processing, providing, and/or routing information associated with linking physical location data and online channel data in a database, as described elsewhere herein. The server device 310 may include a communication device and/or a computing device. For example, the server device 310 may include a server, such as an application server, a client server, a web server, a database server, a host server, a proxy server, a virtual server (e.g., executing on computing hardware), or a server in a cloud computing system. In some implementations, the server device 310 includes computing hardware used in a cloud computing environment.

The data source 320 includes one or more devices capable of receiving, generating, storing, processing, and/or providing information associated with linking physical location data and online channel data in a database, as described elsewhere herein. The data source 320 may include a communication device and/or a computing device. For example, the data source 320 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 320 may communicate with one or more other devices of environment 300, as described elsewhere herein.

The client device 330 includes one or more devices capable of receiving, generating, storing, processing, and/or providing information associated with linking physical location data and online channel data in a database, as described elsewhere herein. The client device 330 may include a communication device and/or a computing device. For example, the client device 330 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 340 includes one or more wired and/or wireless networks. For example, the network 340 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 340 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
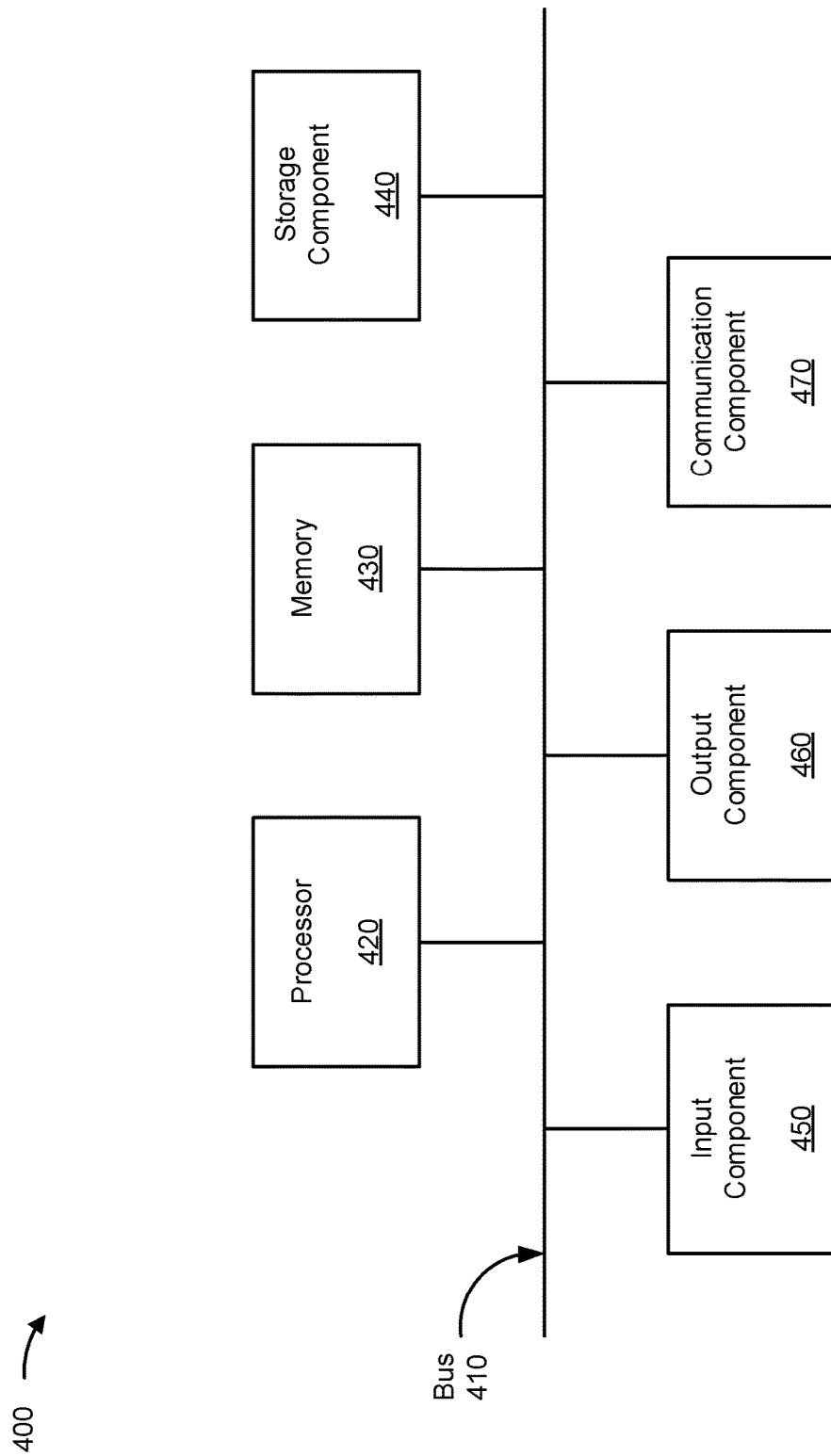
FIG. 4 is a diagram of example components of one or more devices of FIG. 3.

FIG. 4 is a diagram of example components of a device 400, which may correspond to server device 310, data source 320, and/or client device 330. In some implementations, server device 310, data source 320, and/or client device 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440)

may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with linking physical location data and online channel data in a database. In some implementations, one or more process blocks of FIG. 5 may be performed by a device (e.g., server device 310). In some implementations, one or more process blocks of FIG. 5 may be performed by another device or a group of devices separate from or including the device, such as data source 320 and/or client device 330. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving, from one or more data sources, information indicating a plurality of data sets (block 510). In some implementations, the plurality of data sets indicate information associated with respective physical locations or online locations. As further shown in FIG. 5, process 500 may include identifying a data set, from the plurality of data sets, that indicates information associated with an online location (block 520). In some implementations, the information includes at least one of an entity name, an address, a phone number, a uniform resource locator, an entity identifier, or metadata. As further shown in FIG. 5, process 500 may include parsing the data set to identify information for a set of features (block 530). As further shown in FIG. 5, process 500 may include analyzing the information for the set of features to determine a brand associated with the online location (block 540). As further shown in FIG. 5, process 500 may include pairing the online location with the brand in the database such that the online location is linked with a first physical location of the brand in the database (block 550).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for linking physical location data and online channel data of entities in a database, the system comprising:
    one or more memories; and
    one or more processors, communicatively coupled to the one or more memories, configured to:
        receive information associated with a plurality of locations,
            wherein the plurality of locations include at least one in-person location and at least one online location;
        identify, from the plurality of locations, candidate locations;
        parse information associated with the candidate locations to identify information for a set of features for the candidate locations, wherein the set of features includes at least one of a name, a phone number, a geographic location, a uniform resource locator, a headquarters address, an entity category, metadata, or transaction data, and wherein parsing the information comprises:
identifying the set of features by obtaining the set of features from structured data by performing natural language processing to extract the set of features from unstructured data;

iteratively training a machine training model, comprising at least one of a neural network or a support vector, to generate a trained machine learning model, wherein the trained machine learning model is trained using the set of features;

apply the trained machine learning model to the information for the set of features for the candidate locations;

determine, based on applying the trained machine learning model, that a score associated with an output of the trained machine learning model satisfies a threshold,
wherein the score indicates a likelihood that the candidate locations are associated with a same entity;

determine, based on the score, whether the candidate locations are associated with the entity; and add information associated with the candidate locations to a graph associated with the entity if the candidate locations are associated with the same entity;

receive a request to generate one or more temporary credentials associated with the entity;

identify, based on the graph, at least one online location and at least one physical location associated with the entity; and generate, based on identifying the at least one online location and the at least one physical location associated with the entity, the one or more temporary credentials,
wherein the one or more temporary credentials are enabled to complete one or more transactions at the at least one online location and the at least one physical location.

2. The system of claim 1, wherein the one or more processors are further configured to:
receive, from a client device, a request for information associated with the entity;
retrieve, from a database, the graph associated with the entity;
identify the information associated with the entity based on the graph; and
provide, to the client device, the information associated with the entity.

3. The system of claim 2, wherein the information associated with the entity includes at least one of:
in-person locations and online locations of the entity, or
transaction data associated with the entity.

4. The system of claim 1, wherein the one or more processors are further configured to:
receive transaction data that indicates the at least one in-person location or the at least one online location associated with a transaction;
identify that the at least one in-person location or the at least one online location associated with the transaction are indicated in the graph associated with the entity; and associate the transaction with the entity and the at least one in-person location or the at least one online location.

5. The system of claim 1, wherein the graph includes nodes that correspond to information of one or more of the at least one online location or the at least one physical location, and
wherein one or more nodes, of the nodes, that are associated with the same entity are connected via links.

6. The system of claim 1, wherein the one or more processors are further configured to:
provide the one or more temporary credentials.

7. A method of linking physical locations and online locations with a brand in a database, comprising:
receiving, by a device and from one or more data sources, information indicating a plurality of data sets,
wherein the plurality of data sets indicate information associated with respective physical locations or online locations;
identifying, by the device, a data set, from the plurality of data sets, that indicates information associated with an online location,
wherein the information includes at least one of an entity name, an address, a phone number, a uniform resource locator, an entity identifier, or metadata;
parsing, by the device, the data set to identify information for a set of features,
wherein parsing the information comprises:
identifying the set of features by obtaining the set of features from structured data by performing natural language processing to extract the set of features from unstructured data;
iteratively training a machine training model, comprising at least one of a neural network or a support vector, to generate a trained machine learning model,
wherein the trained machine learning model is trained using the set of features;
determining, by the device and based on applying the trained machine learning model to the information for the set of features, that a score associated with an output of the trained machine learning model satisfies a threshold,
wherein the score indicates a likelihood that the online location is associated with a brand;
determining, based on the score, the brand associated with the online location;
pairing, by the device, the online location with the brand in the database such that the online location is linked with a first physical location of the brand in the database; and
adding information associated with the online location to a graph associated with the brand,
wherein the graph provides link information associated with at least one online location and at least one physical location related to the brand, and
wherein the graph comprises links indicating that the at least one online location and at least one physical location are associated with the same brand;
receiving a request to generate one or more temporary credentials associated with the brand;
identifying, based on the graph, the at least one online location and the at least one physical location associated with the brand; and
generating based on identifying the at least one online location and the at least one physical location associated with the brand, the one or more temporary credentials, wherein the one or more temporary credentials are enabled to complete one or more transactions at the at least one online location and the at least one physical location.

8. The method of claim 7, further comprising:
creating a subset of the graph, wherein the graph is associated with the brand, and
   wherein the subset of the graph links the at least one physical location of the brand with the at least one online location of the brand.

9. The method of claim 7, further comprising:
identifying a different data set, from the plurality of data sets, that indicates information associated with a second physical location;
parsing the different data set to identify information for the set of features;
determining, based on analyzing the information for the set of features, that the second physical location is associated with the brand; and
pairing, in the database, the second physical location with the brand such that the second physical location is linked with the online location and the first physical location.

10. The method of claim 7, further comprising:
comparing the plurality of data sets;
determining that the one or more data sets, of the plurality of data sets, have a likelihood of being associated with the brand based on comparing the plurality of data sets; and
identifying the one or more data sets based on determining that the one or more data sets have a likelihood of being associated with the brand.

11. The method of claim 7, further comprising:
receiving an indication of a transaction completed at an entity location using resources of an account;
identifying, in the database, a brand associated with the entity location; and
providing, to a client device associated with the account, information associated with the brand, wherein the information associated with the brand includes at least one of:
   a logo or brand identifier,
   a uniform resource locator of an online location associated with the brand,
   an incentive or reward program associated with the brand, or
   transaction data associated with the brand.

12. The method of claim 7, further comprising:
obtaining, from the database, transaction data associated with the brand, wherein the transaction data includes transaction data associated with each physical location and each online location linked with the brand in the database.

13. The method of claim 7, wherein the graph includes nodes that correspond to information of at least one of the at least one online location or the at least one physical location, and
   wherein one or more nodes, of the nodes, that are associated with the same entity are connected via links.

14. The method of claim 7, wherein the machine learning model is trained with information associated with a set of features for one or more locations associated with one or more brands, including the brand.

15. The method of claim 7, further comprising:
providing the one or more temporary credentials.

16. A non-transitory computer-readable medium storing a set of instructions, the set of instructions comprising:
one or more instructions that, when executed by one or more processors of a device, cause the device to:
   receive information associated with physical locations of entities and online channels of entities,
      wherein the information includes a plurality of data sets, and
      wherein each data set, of the plurality of data sets, indicates information associated with a physical location or an online channel;
   process the information based on one or more features to identify candidate data sets,
      wherein the candidate data sets include two or more data sets, of the plurality of data sets, with at least one data set associated with a physical location and at least one data set associated with an online channel, and
      wherein processing the information comprises:
         identifying the candidate data sets by obtaining the candidate data sets from structured data by performing natural language processing to extract the candidate data sets from unstructured data;
   iteratively training a machine training model, comprising at least one of a neural network or a support vector, to generate a trained machine learning model,
      wherein the trained machine learning model is trained using the candidate data sets;
   apply the trained machine learning model to the candidate data sets to determine a score,
      wherein the score indicates a likelihood that the two or more data sets are associated with a same entity;
   link the two or more data sets in a database based on a determination that the score satisfies a threshold,
      wherein the linking indicates that the two or more data sets are associated with the same entity; and
   add information associated with the two or more data sets to a graph associated with the same entity;
   receive a request to generate one or more temporary credentials associated with the entity;
   identify, based on the graph, at least one online location and at least one physical location associated with the entity; and
   generate, based on identifying the at least one online location and the at least one physical location associated with the entity, the one or more temporary credentials,
      wherein the one or more temporary credentials are enabled to complete one or more transactions at the at least one online location and the at least one physical location.

17. The non-transitory computer-readable medium of claim 15, wherein the one or more instructions, when executed by the one or more processors, further cause the device to:
create a subset of the graph, associated with the entity, that indicates physical locations or online channels associated with the two or more data sets and that links the physical locations and the online channels associated with the entity; and
store the subset of the graph in the database.

18. The non-transitory computer-readable medium of claim 16, wherein the one or more instructions, when executed by the one or more processors, further cause the device to:

obtain one or more data sets, of the plurality of data sets, via an automated web-based interaction, wherein the one or more data sets indicate information associated with online channels.

19. The non-transitory computer-readable medium of claim 16, wherein the one or more instructions, that cause the device to process the information based on the one or more features to identify the candidate data sets, further cause the device to:
  compare the plurality of data sets based on the one or more features;
  determine that two or more data sets, of the plurality of data sets, have a likelihood of being associated with the same entity based on comparing the plurality of data sets; and
  determine that the two or more data sets are to be included in the candidate data sets based on determining that the two or more data sets have a likelihood of being associated with the same entity.

20. The non-transitory computer-readable medium of claim 16, wherein the one or more instructions, when executed by the one or more processors, further cause the device to:
  provide the one or more temporary credentials.

* * * * *